US007511478B2

(12) United States Patent
Ganev

(10) Patent No.: US 7,511,478 B2
(45) Date of Patent: Mar. 31, 2009

(54) SENSORLESS POSITION MEASUREMENT METHOD FOR SOLENOID-BASED ACTUATION DEVICES USING INDUCTANCE VARIATION

(75) Inventor: Evgeni Ganev, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 370 days.

(21) Appl. No.: 11/197,163

(22) Filed: Aug. 3, 2005

(65) Prior Publication Data

US 2007/0030619 A1 Feb. 8, 2007

(51) Int. Cl.
*G01B 7/14* (2006.01)
*G01B 7/30* (2006.01)

(52) U.S. Cl. ............................ 324/207.16; 324/207.15; 324/207.24; 324/207.25; 324/239

(58) Field of Classification Search ................ 324/71.1, 324/418, 207.24–207.25, 415–416, 654, 324/699, 238–240, 713, 716, 244, 260; 137/551, 137/556, 553–554; 361/154, 160, 166–167, 361/170, 179, 187; 251/129.15
See application file for complete search history.

(56) References Cited

U.S. PATENT DOCUMENTS 4,945,331 A * 7/1990 Kashio ........................ 335/274
5,094,260 A * 3/1992 Stuart et al. ................. 137/102
5,424,637 A 6/1995 Oudyn et al.
5,583,434 A 12/1996 Moyers et al.
5,600,237 A * 2/1997 Nippert ................. 324/207.16
5,602,711 A 2/1997 Curtis et al.
5,685,337 A * 11/1997 Yoo ....................... 137/596.17
5,942,892 A 8/1999 Li
6,208,497 B1 3/2001 Seale et al.
6,300,733 B1 10/2001 Bergstrom

FOREIGN PATENT DOCUMENTS

DE 195 05 219 A1 8/1996
WO WO 97/04230 A1 2/1997

OTHER PUBLICATIONS

International Search Report dated Aug. 16, 2007.

* cited by examiner

*Primary Examiner*—Bot LeDynh
(74) *Attorney, Agent, or Firm*—Oral Caglar, Esq.

(57) ABSTRACT

A sensorless position measurement method may be used to determine the position of a solenoid-based actuator which controls some substance. The sensorless position measurement method of the present invention eliminates the need for a dedicated sensor in the actuator device, as well as the associated electrical connections between this sensor and the system controller.

17 Claims, 5 Drawing Sheets

SENSORLESS POSITION MEASUREMENT METHOD FOR SOLENOID-BASED ACTUATION DEVICES USING INDUCTANCE VARIATION

BACKGROUND OF THE INVENTION

The present invention generally relates to position measurement of an actuation device and, more specifically, to methods and apparatus for sensorless position measurement of an actuation device using inductance variation.

There is a broad range of solenoid-based actuation devices used in the aerospace industry. The prime purpose of these devices is either to deliver motion or to use the mechanical stroke for controlling secondary electric, gas or fluid substances. The motion results from energizing the coil of the solenoid with current. One class of these devices has the relatively simple task associated with only two end positions. Other devices have to maintain accurate position at any point between the end positions. Regardless of the system implementation in most of the cases, the actual position of the actuation device is required to be known and fed back to the controller. In many applications, this information is vital to proper system operation. Furthermore, the knowledge of the position is often a matter of safety concerns.

There are numerous applications in which the exact position of an actuation device is required for control or protection. Conventional measurement methods use position-sensing devices that have different levels of complexity and cost. These conventional devices require additional hardware, such as interface cables for signal transfer to the controller and supply lines for sensor excitation. Additional signal condition and interface connectors are also required. This additional hardware increases the cost of the systems, reduces reliability and limits the applicability of these devices due to environmental constraints on the sensors.

There are a broad range of solenoid-based actuation devices. Linear actuators are used for linear positioning or transfer of linear force. Rotary actuators are used for rotary positioning or transfer of force. Contactors are used for control and protection purposes of high-power electric substances. Relays are used for control and protection of low-power electric substances. Valves are used for control and protection of gasses and fluids. Electromechanical brakes are used for many applications, including airplane brakes. Electromechanical clutches are devices used for mechanical engagement and disengagement of rotating shafts. The above list of solenoid-based actuation devices covers the commonly used devices.

Referring to FIG. 1, there is shown a schematic diagram of a conventional control system for a solenoid-based actuation system 10 for positioning a controlled substance 26. The actuation system 10 includes a controller 12 and an actuation device 14. A solenoid 16 may be part of the actuation device 10 and may be controlled by a solenoid driver 18, such as a PWM converter, via a solenoid control feeder 28. Positional information may be measured by a position sensor 20 and transferred back to the controller 12 via a sensor cable 22. A sensor conditioner 24 may then condition the signal as necessary for processing by the controller 12. Sensor cable 22 may contain supply or excitation lines required for operation of the position sensor 20. The position sensor 20, the conditioner 24 and the interface hardware imposes a penalty on overall system cost, reliability and applicability of the actuation device for various applications that operate in a more challenging environment.

U.S. Pat. No. 5,583,434, issued to Moyers et al., discloses methods and apparatus for monitoring armature position in direct current solenoids. A special device and circuit are used in order to generate and introduce alternating current required for the measurement. Moreover, the method of the '434 patent uses sinusoidal measurements, thereby requiring two sensors to measure current and voltage. Furthermore, in order to get the desired data, complex calculations are required of the measured values.

As can be seen, there is a need for an improved position measurement method and apparatus for actuation devices. Furthermore, there is a need for an improved actuation device position measurement method and apparatus that eliminates the need for a dedicated sensor and the associated interfaces within the controller.

SUMMARY OF THE INVENTION

In one aspect of the present invention, a method for determining position of a solenoid-based actuation device, the method comprises applying a modulated voltage to a coil of a solenoid to produce a control current in the coil; measuring changes in a solenoid ripple current; and calculating a correlation between the measured changes in solenoid ripple current and the position of the actuator controlling a substance.

In another aspect of the present invention, a method for the sensorless measurement of a controlled substance, the method comprises applying current to a solenoid of an actuator device; measuring the current ripple produced by the solenoid; and correlating the measured current ripple with the position of the actuator.

In yet another aspect of the present invention, a device for measuring the state of a controlled substance comprises an actuator device; a solenoid within the actuator device; a controller; a solenoid control feeder for supplying a modulated voltage to the solenoid; and a feeder return for determining a ripple current in the solenoid.

These and other features, aspects and advantages of the present invention will become better understood with reference to the following drawings, description and claims.

DETAILED DESCRIPTION OF THE INVENTION

Figure 1:
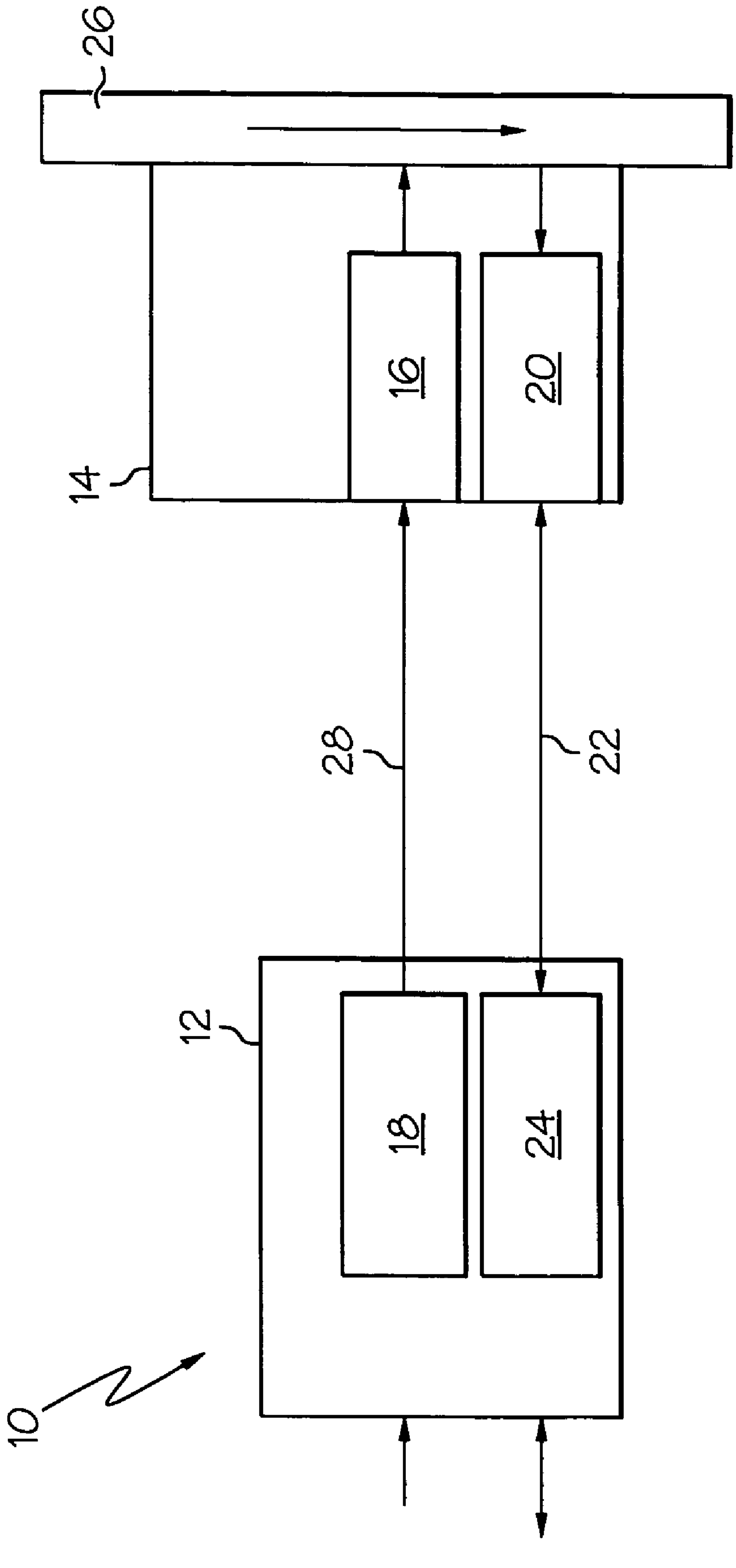
FIG. 1 (PRIOR ART)
FIG. 1 is a schematic diagram of a conventional actuator positional measurement device.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides methods and apparatus for a sensorless position measurement for solenoid-based actuation devices using inductance variation. Unlike conventional position measurement methods which use various position sensing devices, the present invention may eliminate the need for a dedicated sensor and the associated interfaces within the controller. The method of the present invention may be based on indirect measurement of the solenoid inductance that varies with the air-gap for the device. Thus, a correlation between the position and measured inductance is found. The excitation lines for the solenoid may be used for obtaining the information for the solenoid inductance. The present invention may find use in many applications where the various types of actuators may be used, including applications in the aerospace industry.

The present invention may eliminate the need for a position sensor within the actuator device, resulting in increased reliability, reduced cost, reduced volume, reduced weight, no need for additional supply, improved system efficiency and improved EMI environment. The present invention may eliminate the cable interface between the controller and the sensor, including insulated wire, shielding, connectors with EMI back-shells, mating connectors on the device and a mating connector on the controller. Moreover, internal interfaces in the actuator device and in the controller may be eliminated. The present invention may be useful in a variety of challenging environments, such as a broad temperature range, broad shock and vibration signature, and broad radiation susceptibility.

The operation of the solenoid-based actuation type device may be based on the magneto-motive force created as a result of current flow in the winding of a solenoid. The current may create flux that flows in a magnetic circuit. The electromagnetic law postulates that the lines of the flux have a tendency to shorten. Therefore, a force may be created in the area where the air gap is located. This force is used for an actuation motion. The stroke of the actuation motion may be equal to the maximum air-gap. A combination of electromechanical and control devices may comprise an actuation system. The actuation system may be able to position the target object to any desirable position within the predefined stroke. A, simple case is when only two end positions are required.

The regulation of the current in the solenoid may be provided by linear or switching dc/dc converters and regulators. The switching converters may be the desirable solution since they may provide much better efficiency. There are a great variety of switching converters and modulation schemes that can be applied for controlling the current in a solenoid.

By means of a non-limiting example, one such scheme will be discussed to verify the viability of this method. In this scheme, an H bridge comprising two switches and two diodes with a capacitor across the dc supply will be used as a converter. A two-state modulation scheme will be applied. That is, both switches will be simultaneously modulated with a constant frequency. When the switches are on, the solenoid is connected to the voltage supply and the current increases per Formula 1. Vdc is the supply voltage. L is the solenoid inductance.

$$di/dt=Vdc/L \quad (1)$$

When the switches are off, the solenoid is connected to the voltage supply in the opposite direction and the current decreases per Formula 2.

$$di/dt=-Vdc/L \quad (2)$$

The peak value of the current ripple $i_{pp}$ is defined in Formula 3. The modulation frequency is f.

$$i_{pp}=-Vdc/(2*L*f) \quad (3)$$

A simulation program was created to verify the concept for the position measurement method. The model provided parallel calculation and accounts for solenoid electrical parameters and realistic semiconductor devices.

The parameters of a clutch device used for mechanical engagement and disengagement are used to check the viability of the concept. The clutch is a part of a universal actuator.

Table 1 summarizes the major parameters involved. The air gap varies from close to zero to about 0.03 in. The inductance varies approximately four times for the entire stroke resulting in a current ripple variation from about 2.5 to about 10 milliamps.

TABLE 1

TWO STATE MODULATION SCHEME

| Air-gap, in. | Inductance, Henry | Current Ripple, milliamps |
|---|---|---|
| 0.003 | 4.8 | 2.500 |
| 0.004 | 4.4 | 2.727 |
| 0.006 | 3.5 | 3.429 |
| 0.008 | 2.8 | 4.286 |
| 0.010 | 2.4 | 5.000 |
| 0.020 | 1.5 | 8.000 |
| 0.030 | 1.2 | 10.000 |

Modulation Frequency: 5000 Hz
Supply Voltage: 120 Vdc

Figure 2:
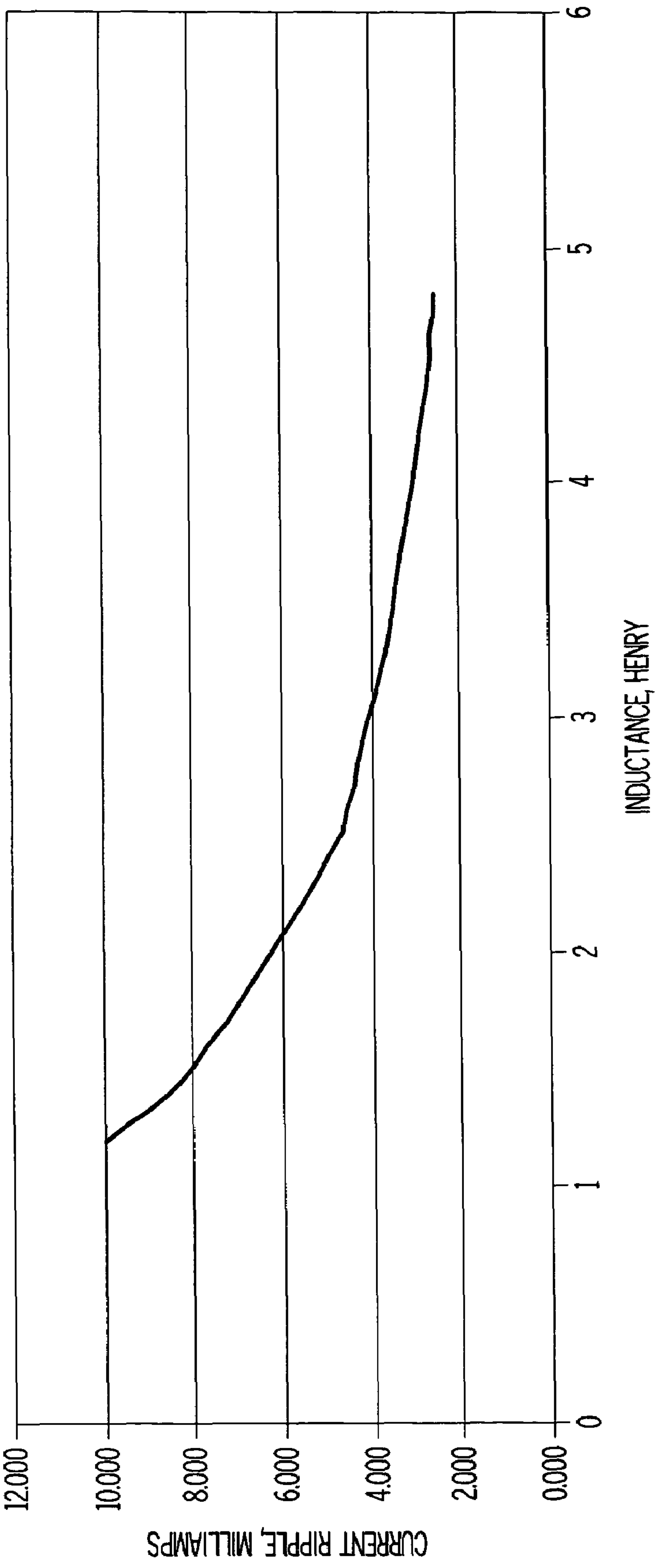
FIG. 2 is a graph showing the relationship between current ripple and inductance.
Figure 3:
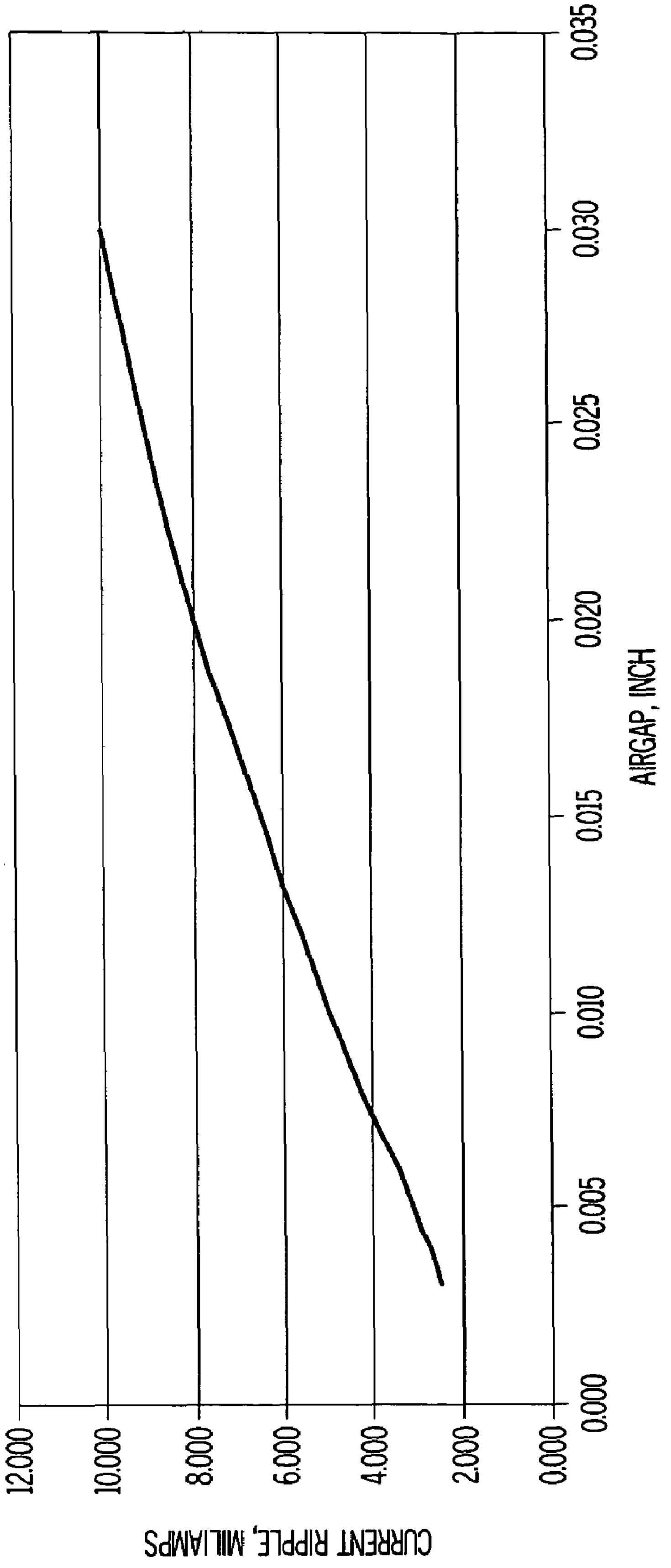
FIG. 3 is a graph showing the relationship between current ripple and airgap.

FIG. 2 represents the relationship between the current ripple and the inductance. FIG. 3 shows the relationship between the air gap and the current ripple. The relationship between the air gap and the current ripple in FIG. 3 is relatively linear, facilitating the signal conditioning to obtain good position information and to support accurate position control.

Figure 4:
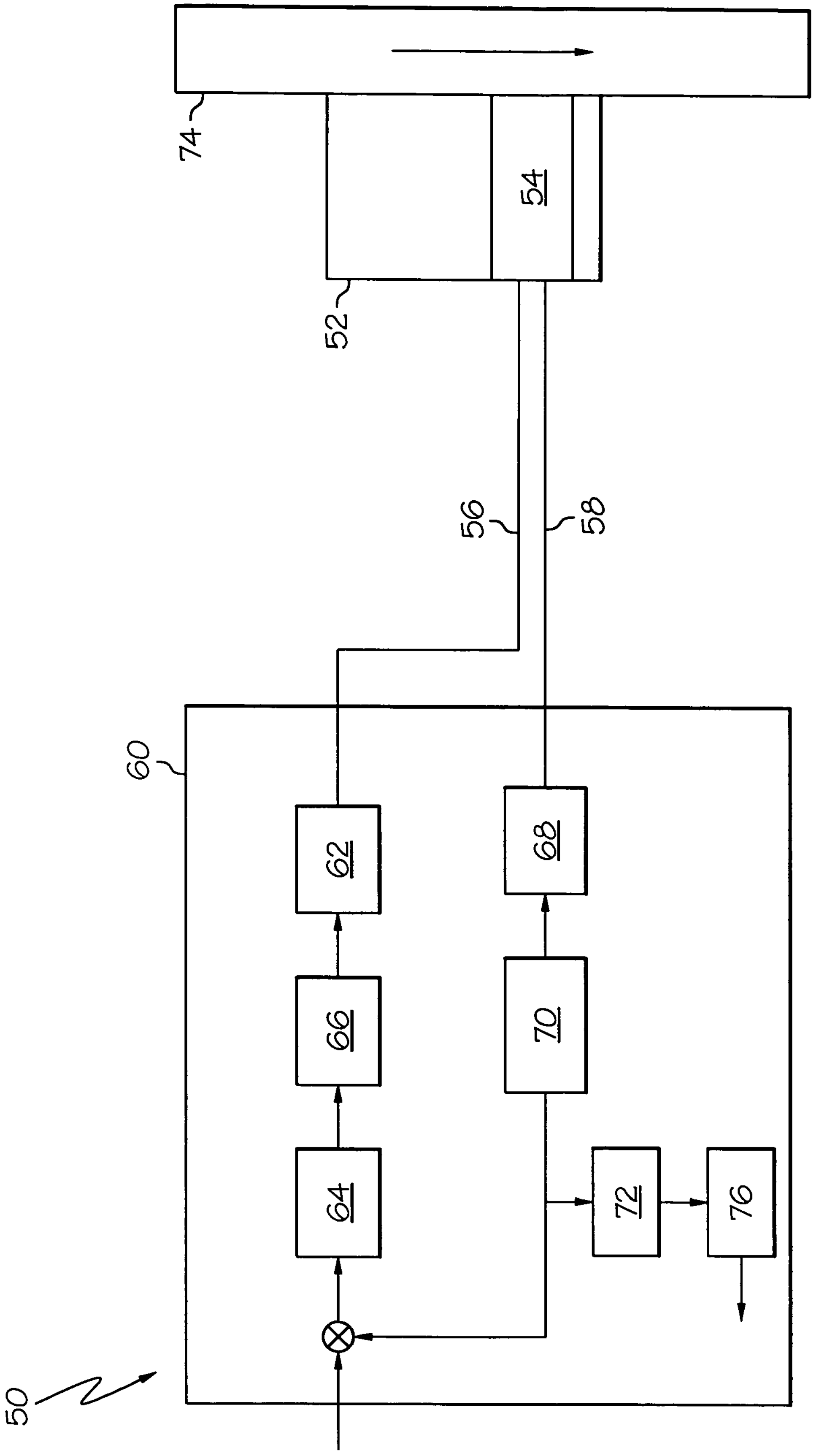
FIG. 4 is a schematic diagram showing an actuator positional measurement device according to one embodiment of the present invention.

Referring now to FIG. 4, there is shown a block diagram representing an actuator positional measurement device 50 according to the present invention. An actuator device 52 may be positioned next to a controlled substance 74. The actuator device 52 may include a solenoid 54 without the need for a position sensor as is the case in conventional designs (see FIG. 1). The actuator device 52 may be any one of a broad range of solenoid-based actuation devices. These include, for example, linear actuators useful for linear positioning or transfer of linear force, rotary actuators useful for rotary positioning or transfer of rotary force, and contactors useful for control and protection purposes of high-power electric substances. The controlled device may be controlled by the actuator device 52. These may include, for example, relays useful for control and protection of low-power electronic substances, valves useful for control and protection of gasses and fluids, electromechanical brakes useful in many applications such as airplane brakes, and electromechanical clutches useful for mechanical engagement and disengagement of rotating shafts.

A solenoid control feeder 56 and a feeder return 58 may electrically connect the actuator device 52 with a controller 60. In one embodiment of the present invention, the controller 60 may be located at a position separately from the actuator device 52. Unlike conventional designs, there is no need for separate sensor cables to connect the actuator device 52 and the controller 60 (see, for example, sensor cable 22 in FIG. 1).

A switching regulator 62 may be used in the controller 60 to regulate the current in the solenoid 54. By means of a non-limiting example, the current may be delivered to the switching regulator 62 via a current regulator 64 and a pulse-width modulation controller 66. Other modulation means, such as two-state modulation, three-state modulation and bang-bang control may be used to control the current delivered to the solenoid 54.

The feeder return 58 may provide return current from the solenoid 54 to a current sensor 68 within the controller 60. By means of a non-limiting example, the sensed current may be processed by an analog/digital converter 70, with the processed current monitored by a peak detector 72 to determine the ripple current. This determined ripple current may be used as an input for a look up table 76 to determine the state of the controlled substance 74. Other signal conditioning methods may be used to extract information from the current ripple correlated to the air gap.

Figure 5:
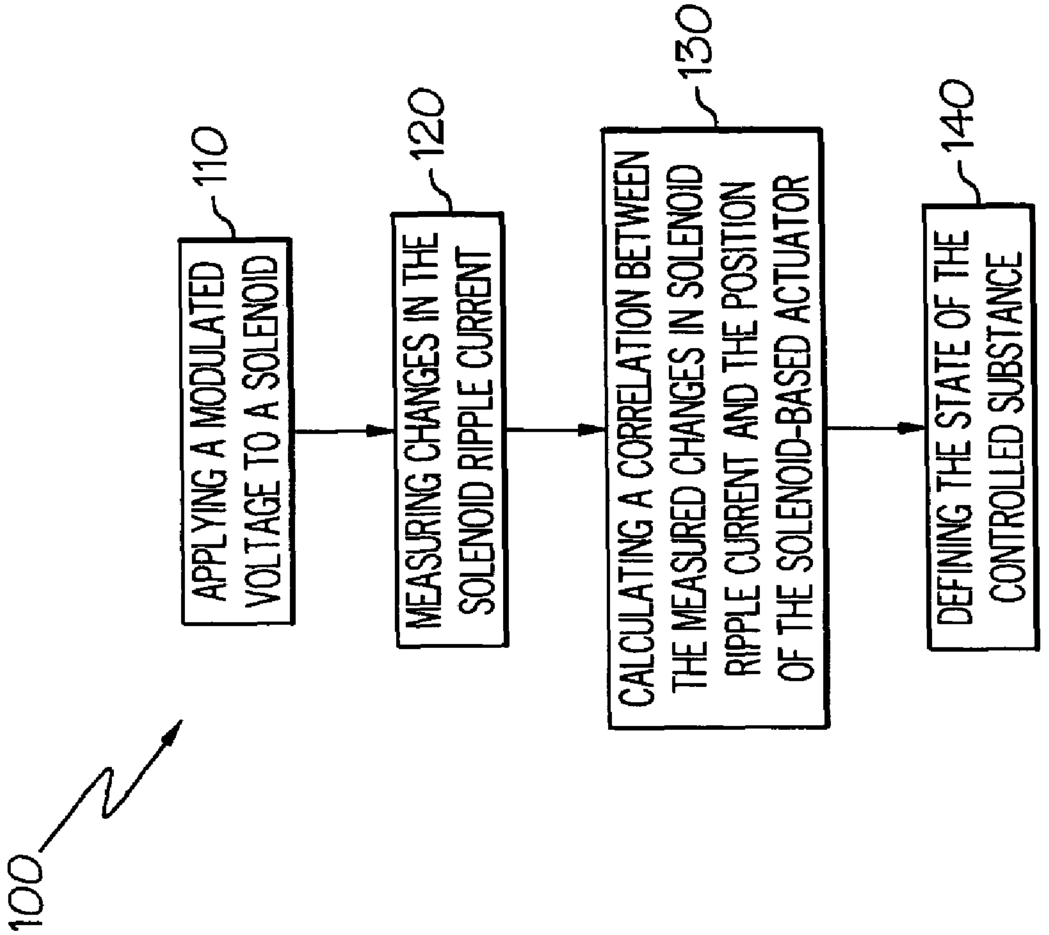
FIG. 5 is a flow chart describing a method according to the present invention.

Referring to FIG. 5, there is shown a flow chart describing a method 100 for determining the position of a solenoid based actuator controlling some substance. Step 110 may involve applying a modulated voltage to a solenoid in an actuator device. This application can result in a control current produced in the coil of the solenoid. Step 120 may involve measuring changes in the solenoid ripple current. This may be achieved by a current sensor in a controller located separately from the actuator device. Step 130 may involve calculating a correlation between the measured changes in solenoid ripple current and the position of the solenoid-based actuator. In step 140, this correlation may be used to determine the state of the controlled substance with respect to the actuator.

The method of the present invention may allow for both analog and digital implementations. If analog electronics are used, a small signal conditioning circuit, as is known in the art, may be required. If digital electronics are used, no additional hardware may be required.

The method of the present invention may eliminate the need for a dedicated position sensor and associated interfaces with the controller. The method of the present invention is based on indirect measurement of the solenoid inductance, which varies with the air gap of the device. Hence, an adequate correlation between the position of the device and measured inductance may be found. By combining the advantages of solenoid-based actuation devices with the position sensing scheme of the present invention, one can envision positive changes in the perspective of actuation utilization.

It should be understood, of course, that the foregoing relates to exemplary embodiments of the invention and that modifications may be made without departing from the spirit and scope of the invention as set forth in the following claims.

I claim:

1. A method for determining position of a solenoid-based actuator which controls a substance, the method comprising:

applying a modulated voltage to a coil of a solenoid to produce a control current in the coil;

measuring a change in a solenoid ripple current, wherein the change in the solenoid ripple current is variable, as a function of the position of the solenoid-based actuator; and calculating a correlation between the measured change in solenoid ripple current and a position of the solenoid-based actuator controlling the substance wherein a two-state modulation or a three-state modulation scheme is used to produce a constant frequency from the solenoid.

2. The method according to claim 1, wherein the solenoid-based actuator is positioned near the substance.

3. The method according to claim 2, wherein the step of measuring the changes in the solenoid ripple current and the step of calculation the correlation between the measured changes in the solenoid ripple current and the position of the substance is performed in a controller separate from the actuator device.

4. The method according to claim 3, further comprising electronically connecting the actuator device with the controller via a solenoid control feeder and a feeder return.

5. The method according to claim 1, wherein the modulated voltage is applied via a pulsewidth modulation controller and a switching regulator.

6. The method according to claim 1, further comprising look up table inductance to air gap correlation to determine the position of the solenoid-based actuator and the state of the substance.

7. The method according to claim 1, wherein the actuator device is selected from the group consisting of relays, valves, electromechanical brakes and electromechanical clutches.

8. A method for the sensorless measurement of the state of a controlled substance, the method comprising:

applying a modulated voltage to a solenoid of an actuator device;

measuring a current ripple produced by the solenoid; wherein said current ripple is variable, as a function of the position of the controlled substrate; and inputting the measured current ripple into a look-up table to correlate the current ripple produced by the solenoid with the position of the actuator device used to define the state of the controlled substance;

wherein a two-state modulation or a three-state modulation scheme will be used to produce a constant frequency from the solenoid.

9. The method according to claim 8, wherein the modulated voltage is applied via a pulsewidth modulation controller and a switching regulator.

10. The method according to claim 8, further comprising electronically connecting the actuator device with a controller via a solenoid control feeder and a feeder return.

11. The method according to claim 10, further comprising:

sensing a return current in a current sensor via the feeder return;

converting the sensed current with an analog/digital converter within the controller; and detecting the current ripple with a peak detector.

12. A device for measuring the position of a solenoid-based actuator and a substance comprising:

an actuator device;

a solenoid within the actuator device;

a controller located separately from the actuator device;

a solenoid control feeder for supplying a modulated voltage to the solenoid;

a feeder return for determining a ripple current in the solenoid; and a current sensor, an analog/digital converter and a ripple detector for measuring the ripple current in the solenoid, wherein the ripple current magnitude is determined based on the following equation:

$$i_{pp} = -Vdc/(2*L*f)$$

where $i_{pp}$=ripple current magnitude;

Vdc=supply voltage;

L=solenoid inductance; and f=modulation frequency.

13. The device according to claim 12, further comprising a pulsewidth controller and a switching regulator to provide the modulated voltage to the solenoid.

14. The device according to claim 12, wherein the pulse-width controller and the switching regulator are located in the controller, the controller being separate from the actuator device.

15. The device according to claim 12, wherein the current sensor, the analog/digital converter and the ripple detector are located in the controller, the controller being separate from the actuator device.

16. The device according to claim 12, wherein the actuator device is one of a linear actuator, a rotary actuator and a contactor.

17. The device according to claim 12, wherein the actuator device is from the group consisting of relays, valves, electromechanical brakes and electromechanical clutches.

* * * * *